Patented June 13, 1939

2,162,451

UNITED STATES PATENT OFFICE 2,162,451

ESTER INTERCHANGE WITH ORGANIC ACIDS

Harald W. de Ropp, Charleston, W. Va., assignor to E. I. du Pont de Nemours & Company, Wilmington, Del., a corporation of Delaware No Drawing. Application July 14, 1936, Serial No. 90,536

14 Claims. (Cl. 260—491)

This invention relates to the synthesis of organic compounds and more particularly to the preparation of aliphatic esters by the interaction of esters of lower molecular weight aliphatic acids with higher aliphatic acids.

It is an object of the present invention to provide an improved process for the preparation of aliphatic organic esters. Another object of the invention is to provide an improved process for shifting the reaction between an aliphatic monocarboxylic acid ester and an aliphatic monocarboxylic acid in the direction of the opposite ester, the acid containing at least one more carbon atom than the esterified acid reacted. A still further object of the invention is to provide optimum conditions and highly efficient catalysts for carrying out said organic syntheses. Other objects and advantages will hereinafter appear.

I have found that normal and isopropyl acetates and normal and isobutyl acetates can be produced by the reaction of normal and isopropyl formates and normal and isobutyl formates with acetic acid. This process proceeds in accord with the equation:

HCOOR+CH₃COOH→HCOOH+CH₃COOR in which R designates a normal propyl, isopropyl, normal butyl or isobutyl radical. The higher molecular weight ester is obtained in accord with my process by withdrawing from the reaction, preferably by distillation, one of the products of the reaction, i. e., either the acid or the ester produced. If the acid or ester has a lower boiling point than the reactants or other product it may be removed by simple distillation. Generally, however, this is not the case and some other method must be employed to give the separation. I have found that this may be accomplished effectively with the assistance of an azeotrope forming agent or withdrawing liquid which forms with the ester or acid product a binary having a boiling point which is lower than the boiling point of any of the reactants or products. Moreover, it is of advantage, for clean separation that the withdrawing liquid does not form a binary or ternary with any of the remaining reactants. Furthermore, it is desirable to employ a withdrawing liquid which forms an azeotrope that separates on condensation into two layers or which will so separate upon the addition of a third component. In lieu of separation by decantation, the third component may assist the separation of the azeotrope into its components through the formation, in its turn, of a binary with a component of the azeotrope, thereby permitting separation by distillation.

My process may be genrally illustrated by a process for the preparation of isobutyl acetate. Isobutyl formate will react with acetic acid to give isobutyl acetate and formic acid in accord with the equation:

HCOOCH₂CH(CH₃)₂+CH₃COOH→
HCOOH+CH₃COOCH₂CH(CH₃)₂ the formic acid being withdrawn from the reaction by means of an azeotrope-forming agent such as, for example, benzene, hexane, trichlorethane, etc. For the preparation of other esters any of the well known addition agents may be employed which will form an azeotrope with the product and which has preferably the other above listed qualifications.

The reaction may be effected by refluxing the ester and the acid in the presence of a suitable esterifying catalyst, such, for example, as sulfuric acid, benzene sulfonic acid and paratoluene sulfonic acid in the presence of, if necessary, a suitable azeotrope forming agent. The still head temperature will, of course, vary in accord with the particular reactants and or azeotrope but will usually range from 20 to 25 degrees C., below the boiling point of the acid produced when an azeotrope is used. Atmospheric pressure is generally satisfactory, but, if desired, subatmospheric or superatmospheric pressures may be employed.

I shall now describe by way of examples methods of conducting my process but it will be understood that I shall not be limited by the details therein given.

*Example I.*—360 parts of crude isobutyl formate (parts are all by weight) containing 85% isobutyl formate and 15% isobutanol, and 584 parts of acetic acid are charged, together with 10 parts of concentrated sulfuric acid as catalyst into a still pot provided with a reflux condenser. The mixture is heated and refluxed at a temperature of approximately 88° C., under atmospheric pressure. The water formed by esterification of the isobutanol with the acetic acid is distilled over and to the residue is added 600 parts of benzene. At a temperature of approximately 74° C., all of the formic acid is distilled over. The acidolysis (i. e. the interchange of the acidic portion of the ester) occurs during this stage of the process. The excess benzene is distilled over. Water is then added in sufficient amount to maintain the still column in a saturated state and the distillation is continued which by means of a decanter head removes substantially all of the ester. The small amount of residual ester may be used to remove the water from the acetic acid. The formic acid and isobutyl acetate are further purified by decantation and distillation. A yield of approximately 95% has been obtained.

Example II.—306 parts isobutyl formate, 540 parts of acetic acid, 600 parts of benzene and 10 cc. of concentrated sulfuric acid were heated in a still pot under reflux for ½ hour at 77° C., the formic acid-benzene azeotrope was fractionated out through a decanter head, from which the lower layer was withdrawn. This layer contained approximately 85% formic acid and 15% benzene. The ester was then steam distilled from the remaining reaction products and gave a 94% yield of isobutyl acetate.

The process is preferably carried out in a continuous manner by returning all distillation by-products except water together with excess reactants to the acidolysis step of the process whereby there results an exceptionally economical process for obtaining higher molecular weight esters.

From a consideration of the above process, it will be appreciated that many changes may be made in the process described without departing from the invention or sacrificing any of its advantages.

I claim:

1. The method of interchanging the alkyl group of an aliphatic monocarboxylic acid ester for the replaceable hydrogen atom of an aliphatic monocarboxylic acid having a greater number of carbon atoms than are present in the acyl portion of the ester which comprises adding an azeotrope-forming agent to the reaction products, which agent forms a binary with only one of the reaction products, said binary having a lower boiling point than any of the reactants or products, and removing the said binary by distillation.

2. The method of interchanging the alkyl group of a formic acid ester for the replaceable hydrogen atom of acetic acid which comprises adding an azeotrope-forming agent to the reaction products, which agent forms a binary with only one of the reaction products, said binary having a lower boiling point than any of the reactants or products, and removing the said binary by distillation.

3. The method of interchanging the alkyl group of a formic acid ester for the replaceable hydrogen atom of acetic acid which comprises removing the formic acid by the addition of benzene and distilling over the benzene-formic acid binary.

4. A process for the preparation of aliphatic monocarboxylic acid esters which comprises reacting a monocarboxylic acid ester and a monocarboxylic acid in accord with the equation:

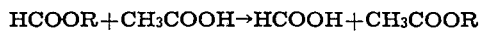

$$HCOOR + CH_3COOH \rightarrow HCOOH + CH_3COOR$$

in which R is a radical of the group consisting of a normal propyl, isopropyl, normal butyl, and isobutyl radical, in the presence of an esterifying catalyst adding an azeotrope-forming agent, which forms a binary with only one of the reaction products, said binary having a lower boiling point than any of the reactants or products, and removing the said binary by distillation.

5. In a process for the preparation of alkyl acetates and formic acid from alkyl formates, in which the alkyl group contains from three to four carbon atoms, the steps which comprise reacting the alkyl formate with acetic acid, in the presence of an esterifying catalyst, adding an azeotrope-forming agent which forms a binary only with the formic acid, this binary having a lower boiling point than any of the reactants or products, and removing the said binary by distillation.

6. In a process for the preparation of isobutyl acetate and formic acid from isobutyl formate the steps which comprise reacting isobutyl formate with acetic acid, in the presence of an esterifying catalyst, adding an azeotrope-forming agent which forms a binary only with the formic acid, this binary having a lower boiling point than any of the reactants or products, and removing the said binary by distillation.

7. In a process for the preparation of normal butyl acetate and formic acid from normal butyl formate the steps which comprise reacting normal butyl formate with acetic acid, in the presence of an esterifying catalyst, adding an azeotrope-forming agent which forms a binary only with the formic acid, this binary having a lower boiling point than any of the reactants or products, and removing the said binary by distillation.

8. In a process for the preparation of isopropyl acetate and formic acid from isopropyl formate the steps which comprise reacting isopropyl formate with acetic acid, in the presence of an esterifying catalyst, adding an azeotrope-forming agent which forms a binary only with the formic acid, this binary having a lower boiling point than any of the reactants or products, and removing the said binary by distillation.

9. A process for the preparation of isobutyl acetate and formic acid which comprises interacting, isobutyl formate and acetic acid in the presence of sulfuric acid as the catalyst, adding an azeotrope-forming agent which forms a binary with only the formic acid, said binary having a lower boiling point than any of the reactants or products, and removing therefrom the formic acid binary by distillation.

10. A process for the preparation of isobutyl acetate and formic acid which comprises interacting, isobutyl formate and acetic acid in the presence of sulfuric acid as the catalyst and benzene as the addition agent at a temperature of approximately 78° C., and simultaneously separating the formic acid-benzene binary formed from the reactants and products.

11. In the process of interchanging the alkyl group of an aliphatic monocarboxylic acid ester for the replaceable hydrogen atom of an aliphatic monocarboxylic acid the steps which comprise adding an azeotrope-forming agent which, with one of the reaction products, forms a binary having a boiling point lower than the boiling point of any of the reactants or products and which does not form any appreciable amounts of an azeotropic mixture with any of the remaining reactants or products, and removing the binary by distillation.

12. The process of claim 11 in which an azeotrope-forming agent is employed which forms a binary that separates on condensation into two layers.

13. A cyclic process for the preparation of formic acid and an ester selected from the group consisting of n-propyl, isopropyl, n-butyl and isobutyl acetate which comprises passing the corresponding alkyl formate and acetic acid into a reaction zone, adding an azeotrope-forming agent which forms a binary with only one of the reaction products, said binary having a lower boiling point than any of the reactants or products, and removing therefrom the formic acid containing binary and separating the ester formed.

14. A cyclic process for the preparation of formic acid and an ester selected from the group consisting of n-propyl, isopropyl, n-butyl and isobutyl acetate which comprises passing the corresponding alkyl formate and acetic acid into a reaction zone, adding an azeotrope-forming agent, which forms a binary with only one of the reaction products, said binary having a lower boiling point than any of the reactants or products, recycling all the distillation by-products except water, removing therefrom by distillation the formic acid binary and separating the alkyl acetate formed.

HARALD W. DE ROPP.